US007428086B2

(12) United States Patent
Dufour et al.

(10) Patent No.: US 7,428,086 B2
(45) Date of Patent: Sep. 23, 2008

(54) METHOD AND APPARATUS FOR SCANNING OPTICAL DELAY LINE

(75) Inventors: Marc L. Dufour, Montreal (CA); Guy Lamouche, Montreal (CA); Bruno Gauthier, St. Sulpice (CA)

(73) Assignee: National Research Council of Canada, Ottawa, Ontario (CA)

( * ) Notice: Subject to any disclaimer, the term of this patent is extended or adjusted under 35 U.S.C. 154(b) by 0 days.

(21) Appl. No.: 11/498,875

(22) Filed: Aug. 4, 2006

(65) Prior Publication Data

US 2007/0091401 A1 Apr. 26, 2007

Related U.S. Application Data

(63) Continuation-in-part of application No. 11/254,748, filed on Oct. 21, 2005, now abandoned.

(51) Int. Cl.
*G02B 26/08* (2006.01)
(52) U.S. Cl. .................................. 359/196; 359/211
(58) Field of Classification Search .............. 359/196
See application file for complete search history.

(56) References Cited

U.S. PATENT DOCUMENTS

| 3,628,870 | A | * | 12/1971 | Hayamizu | 356/150 |
|---|---|---|---|---|---|
| 5,835,642 | A | | 11/1998 | Gelikonov et al. | |
| 5,852,687 | A | | 12/1998 | Wickham | |
| 5,907,423 | A | | 5/1999 | Wang et al. | |
| 6,144,456 | A | | 11/2000 | Chavanne et al. | |
| 6,191,862 | B1 | | 2/2001 | Swanson et al. | |
| 6,243,191 | B1 | | 6/2001 | Fercher | |
| 6,266,182 | B1 | * | 7/2001 | Morita | 359/383 |
| 6,282,011 | B1 | | 8/2001 | Tearney et al. | |
| 6,407,872 | B1 | * | 6/2002 | Lai et al. | 359/833 |
| 6,760,140 | B1 | * | 7/2004 | Argueta-Diaz et al. | 359/245 |

FOREIGN PATENT DOCUMENTS

WO    WO 2004/027491    4/2004

OTHER PUBLICATIONS

Ballif, J. et al., "Rapid and scalable scans at 21 m/s in optical low-coherence reflectometry", Optics Letters, 22: 757-759, 1997.

(Continued)

*Primary Examiner*—Arnel C. Lavarias
*Assistant Examiner*—Jade Callaway
(74) *Attorney, Agent, or Firm*—Hans Koenig

(57) ABSTRACT

A scanning optical delay line includes an optical path element that rotates about its central axis, such that a face is intermittently incident a beam of light to be optically delayed. When the beam is not incident the face, it is reflected onto a reinsertion line which provides a second opportunity for the beam to intersect the optical path element. The optical path element may include one or more parallelogram prisms, or parallel reflective surfaces to provide a substantially linear optical path length variation during the scan, which is produced by the rotation of the optical path element. A highly linear part of the rotation can be maximally used providing a high duty cycle, high linearity scanning optical delay line that permits high quality, high data rate applications.

18 Claims, 12 Drawing Sheets

OTHER PUBLICATIONS

Giniunas, L. et al., "Scanning delay line with a rotating-parallelogram prism for low-coherence interferometry", Applied Optics, 38: 7076-7079, 1999.

Szydlo, J. et al., "Air-turbine driven optical low-coherence reflectometry at 28.6-kHz scan repetition rate" Optics Communications, 154: 1-4, 1998.

Yasa, Z. et al., "A rapid-scanning autocorrelation scheme for continuous monitoring of picosecond laser pulses" Optics Communications, 36: 406-408, 1981.

Riffe, D. et al., "A compact rotating-mirror autocorrelator design for femtosecond and picosecond laser pulses" Review of Scientific Instruments, 69: 3099-102, 1998.

* cited by examiner

METHOD AND APPARATUS FOR SCANNING OPTICAL DELAY LINE

This application is a continuation-in-part of U.S. Ser. No. 11/254,748 filed Oct. 21, 2005 now abandoned.

The present invention relates in general to optical interferometric systems, and in particular to scanning optical delay lines of an interferometric system.

Interferometric systems are deployed in a wide and growing number of applications. Typically, interferometric systems involve two arms, a beam splitter and a beam combiner. A beam of light incident the beam splitter is divided in two: one part of the beam is directed down each of the arms. The two parts are then recombined at a beam combiner. If the parts of the beams are out of phase with respect to each other, they will destructively interfere, resulting in an attenuated recombined beam. If the parts of the beams are in phase, they will constructively interfere, and the recombined beam will maintain (substantially) the power of the incident light beam. If the incident light beam emanates from a broadband source with a finite coherence length, interference phenomena only occur if the path length difference between the two arms is smaller than the coherence length. Typically, one of the two arms, the reference arm, is set to a desired path length, using a scanning optical delay line for example, to investigate a sample placed in the other arm, the sample arm, at a given path length position. In many applications the optical path length of the reference arm is made to vary with a pre-established periodic manner. Based on the interference observed in the recombined beam, a feature in the sample can be determined i) within an accuracy of a fraction of wavelength if the phase information is used, or ii) with an accuracy of the coherence length if only the coherence properties are investigated. Accordingly, interferometric systems are used in many situations for pulse autocorrelation, ranging, profiling, and imaging, among many other applications.

Important parameters for scanning optical delay lines are: a scan range, i.e. a distance over which the optical path length of the reference arm varies, a scan velocity i.e. a rate at which the optical path length of the reference arm may be varied, a duty cycle that determines the fraction of time over which the scanning optical delay line provides a usable, controlled, variation in optical path length, and a linearity of variation of the optical path length. The first three parameters determine a scanning repetition rate of the scanning optical delay line, i.e., the number of cycles of the periodic variation required per unit of time to achieve a specified data output rate. The linearity directly impacts a quality (e.g. signal-to-noise ratio (SNR)) of an optical output of the interferometric system. Additional parameters to take into account in the design of a scanning optical delay line are dispersion effects, polarization effects, and optical power loss. Dispersion and polarization effects can impact the precision of OCT measurements, but can be corrected using known mechanisms. Optical power loss is an additive property that limits the optical path length and number and kind of optical devices that can be included in the arms and still obtain a detectable signal (i.e. a signal of a high enough quality). For the mass production of scanning optical delay lines and for continuous use in medical or industrial environments, important additional criteria are the ease of alignment of the interferometric system and the beam, and the robustness, i.e. an ability for adequate alignment to be maintained in spite of vibrations or other motion of the beam, or the interferometric system.

Development of scanning optical delay lines has been an active field of research recently, especially in the field of Optical Coherence Tomography (OCT) where systems providing high resolution, real-time (high data rate) imaging are required. Recently developed scanning optical delay lines for OCT measurements inherit from all the developments previously performed in the other application fields and thus provide a good overview of the current state of the art. A detailed review of scanning optical delay lines for OCT measurements has been recently published by Andrew M. Rollins and Joseph A. Izaft (in Handbook of OCT, edited by B. E. Bouma and G. J. Tearney, published by Marcel Dekker Inc., New-York, 2002, p. 99).

OCT measurements are generally performed with a scan range of a few millimeters, and require a repetition rate of at least a few kilohertz to allow real-time imaging. Typical OCT scanning optical delay lines are continuously scanned, and retroreflecting, meaning that the light is delivered and collected by the same optics. The scanning optical delay lines used in OCT can be categorized in five categories:

- linear translation of retroreflective elements;
- galvanometer-mounted elements;
- uniformly rotating elements;
- optical fiber approaches; and
- use of a diffraction grating.

The simplest design of a scanning optical delay line is obtained from the mechanical translation of a retroreflective element, as taught, for example by Huang et al., in *Science*, 254, 1178 (1991). Other simple systems are based on a galvanometer-mounted retroreflector as taught by Izatt et al., in IEEE Selected Topics Quantum Electron, 2, 1017 (1996). For scanning ranges of the order of a few millimeters like those usually required in OCT, such systems are limited to repetition rates of the order of 100 Hz, which is too low for real-time imaging. Additionally, such systems also require acceleration and deceleration of a given mass impacting robustness and linearity. Higher repetition rates can be obtained with a galvanometer in a resonance mode, but at the cost of a higher nonlinearity and lower duty cycle.

Higher stability and higher repetition rates can be obtained from the use of uniformly rotating elements since high-speed rotating motors with high rotation stability are commercially available. Examples of such designs are the use of the reflection from the side of a multi-segment CAM (as taught in U.S. Pat. No. 6,191,862 to Swanson et al.) or from the surface of a helicoidal mirror (U.S. Pat. No. 5,907,423 to Wang et al.). These can attain high repetition rates in the kHz range, good linearity, and high duty cycles. Unfortunately such designs require careful machining and alignment.

Another design relies on the use of rotating parallel mirrors (U.S. Pat. No. 6,243,191 to Fercher). It requires a careful assembly to ensure the parallelism of the mirrors, but once assembled, this unit is very easy to align. High repetition rates are achievable, however the system taught by Fercher suffers from non-linearity and a low duty cycle. Still further examples are based on the use of a cube or octagon rotating around its center-of-mass (U.S. Pat. No. 6,144,456 Chavanne et al.), on the use of an ensemble of prisms on a rotating disc on a rotating belt (U.S. Pat. No. 6,407,872 Lai et al.), or on the use of a rotating parallelogram prism [Giniunas et al., Applied Optics, 38, 7076 (1999)]. These designs suffer from one or more of the following: low-duty cycle, nonlinearity, difficult alignment, and lack of robustness.

Some designs are based on the use of fibers. One such approach is based on the stretching of a fiber winded around a piezoelectric plate or cylinder whose expansion induces an scanning optical delay line in the fiber, as in Tearney et al., Optics Letters, 21, 1408 (1996). Such a design can achieve high scanning rates but suffers from high power requirements, poor mechanical and temperature stability, and induced birefringence effects.

A scanning optical delay line based on the use of a diffraction grating was first proposed by Kwong [Kwong et al., Optics Letters, 18, 558 (1993)] and later improved by Tearney [Tearney et al., Optics Letters, 22, 1811 (1997)] which was patented (U.S. Pat. No. 6,282,011). The design involves a "double-pass" optical arrangement usable in retroreflective configuration, which makes the already complex setup even more so. The optical alignment is delicate because many parameters must be considered simultaneously: beat frequency, distance from a focal point of lenses, dispersion compensation, and optical delay. Mechanical stability may be exceedingly difficult for use in an industrial environment or for achieving high accuracy. The optical path length is fairly long (requiring a considerable coherence length of the incident light beam) and the number of optical components makes the design difficult to miniaturize. Furthermore an amplitude of the output signal varies as the mirror moves away from the focal point, posing another constraint on the design.

SUMMARY OF THE INVENTION

Accordingly it is an object of the invention to provide a scanning optical delay line providing a good performance in terms of repetition rate, linearity, and duty-cycle. As such, the scanning optical delay line may be suitable for application in the context of OCT measurements, but its application is not limited to that field.

In accordance with an aspect of the invention, a scanning optical delay line is provided that includes an optical path element rotated about an axis that is directed generally orthogonal to an incidence line in order to vary an angle between the incidence line and a front of the optical path element. The structure rotates substantially uniformly, so that no angular acceleration or deceleration is applied during normal operation. A constant angular velocity improves robustness and longevity of the scanning optical delay line. The optical path element provides a substantially linearly varying optical path length for an incident beam received along the incidence line as a function of angle. Naturally the line of incidence intersects a circular arc swept by any point on the optical path element during a fraction of each cycle of rotation. It is during a part of this (first) fraction of the cycle that the optical path element intersects the incidence line at a range of angles and radial offsets that provides the substantially linearly varying optical path length. Outside of this fraction of the cycle the line of incidence does not meet the optical path element.

The incidence line extends between a beam source and a reflector that reflects a beam transmitted on the incidence line outside of the first fraction of the cycle onto a reinsertion line. The reinsertion line passes a similar distance from the axis of rotation as the incidence line so that in use the reinsertion line defines a second fraction of the cycle during which the reflected input beam is inserted into the optical path element. As will be appreciated by those of skill in the art, the reflector may include one or more surfaces at which the beam may be redirected by reflection, total internal reflection or refraction.

First and second ends for the scanning optical delay line are provided for receiving a beam of light transmitted through the optical path element during the first and second fractions of the cycle, respectively. The ends may be retroreflectors, or transmission elements.

Reinsertion of the optical beam into the optical path element aims at increasing the duty cycle by reusing the beam when it is not intercepted by the optical path element along the incidence line. The beam is redirected by the reflector towards the optical path element in a direction substantially orthogonal to, and at a distance from, the rotation axis such that the optical path length is again varied upon rotation. In some configurations the beam can be reinserted more than once, thereby further increasing the duty cycle and repetition rate. Additionally the reflector and ends of the scanning optical delay line can be positioned in such a way that the center of the scan range can be different for each reinsertion. Consequently, at each revolution of the optical path element, scanning ranges centered on different path length values can be covered, which effectively increases a scanning depth of the apparatus.

In certain embodiments of the invention, the optical path element includes two planar parallel reflectors arranged to enclose a transmission medium in the shape of a parallelogram prism. The parallel planar reflectors are oriented in a direction substantially orthogonal to the axis of rotation to form side walls of the parallelogram optical path element. In some embodiments, the parallelogram optical path element is defined by two parallel mirrors that enclose air, and in other embodiments the parallelogram optical path element is defined by a solid prism of a given refractive index. If the solid prism is used, side walls of the solid prism may be metallized to ensure total reflection. The set of faces of the solid prism used for refraction and reflection are substantially parallel. The degree of parallelism required for the good operation of the scanning optical delay line can currently be obtained with commercially available elements.

It should be noted that a confusion of language exists in relation to the term 'prism' in that it is commonly taken to mean both a geometrical form (i.e. a shape of a class of regular solids), and an optically dispersive medium. Herein 'parallelogram prism' is used to refer to the geometrical form that has a surface that consists of parallel top and bottom parallelogram bases that are interconnected by rectangular faces, expressly without the presumption that the parallelogram prism is a solid, dispersive, medium. In contrast, the term 'prism' as used herein refers to a solid dispersive medium, which in the context of the invention assumes the configuration of a parallelogram prism.

The incidence and reinsertion lines are separated from the axis of rotation by a distance that provides for intersection of an acute corner of the parallelogram optical path element and not an obtuse corner of the parallelogram optical path element during the rotation. In other words, the incidence and reinsertion lines are separated from the axis of rotation by a distance intermediate one half a major diagonal of the parallelogram, and one half a minor diagonal of the parallelogram. In such configuration, a beam input on the incidence or reinsertion line enters a front of the parallelogram optical path element, reflects off each of the side walls once, and exits the parallelogram optical path element at a back of the parallelogram optical path element in a direction parallel to the incidence or reinsertion line for a significant part of a fraction of the cycle of rotation of the parallelogram optical path element.

The fact that the optical path length of an input beam, as it traverses the parallelogram optical path element is independent of the position it hits the front of the parallelogram optical path element (as long as the beam meets the front of the prism within a range of angles and positions at which it undergoes internal reflection off of each of the side walls exactly once), and therefore depends only on an angle between the front and the incidence or reinsertion line, can provide a distinct advantage in the context of this invention. The position independence can significantly improve a robustness of the system and facilitate alignment because specific alignment with respect to the incidence and reinsertion lines are not necessary.

In certain embodiments of the invention, a plurality of parallelogram optical path elements arranged in rotational symmetry around an axis of rotation are used to further improve a duty cycle of the scanning optical delay line. In these embodiments the parallelogram optical path elements are arranged so that a beam exiting the back of one parallel to the incidence or reinsertion line on which it entered, does not encounter any of the other parallelogram optical path elements.

Rotation of the parallelogram optical path elements around an axis not centered on its centroid provides additional freedom in the choice of parameters that can be selected to improve the angular range over which the optical beam intercepts the structure and exits parallel to its initial direction, for example. It also provides freedom to reduce the nonlinearity of the scanning optical delay line while maintaining a duty cycle. The duty cycle is also improved by the number of parallelogram optical path elements used. This embodiment can provide a high sampling rate making the system on par with high-end state-of-the-art scanning optical delay lines, but has greater robustness, and ease of alignment.

To further improve robustness, some embodiments include a synchronization system for time gating an output of the optical scanning optical delay line. The synchronization system may include a sensor that identifies an angular velocity and position of the one or more parallelogram optical path elements. To achieve a higher accuracy, each front of the parallelogram optical path element(s) that intersect the reinsertion and incidence lines can be characterized and the angular position is used to indicate which of the calibrations to apply to each coherence sample. One calibration for each face of the parallelogram optical path element at which the beam is incident, for each Insertion line is ideal. Independent calibration of each insertion increases robustness and ease of alignment of the optical system since all the parallelogram optical path elements do not need to be placed perfectly in the same rotation symmetric orientation or the parallelogram optical path element does not have to rotate about its exact centroid, and the shape of the parallelogram optical path element(s) do(es) not have to be perfect. Small differences in the angle of incidence can be accounted for by appropriate time-gating, and small differences in dimensions of the parallelogram can be accounted for by the use of independent calibration curves. The calibration curves may relate the angular position of a rotating surface that holds fast the parallelogram optical path element(s), to the optical path length. If, for some reason, the rotating surface becomes deformed, or the parallelogram optical path elements move after long-term use, changes to the calibration curves can be readily determined to ensure the precision of the scanning optical delay line over time. Alternatively, because commercial prisms can be bought with very close dimensional tolerance, the same calibration curve can be used for each insertion line, provided appropriate time-gating is performed. a4

In addition to achieving efficiency on par and even exceeding current state-of-the-art scanning optical delay lines, the invention can provide improved ease of alignment and robustness, parameters that are desirable for mass-production and long-term problem-free use.

One advantage of using a prism as the parallelogram optical path element is improved linearity, and one advantage of using parallel mirror configuration of the parallelogram optical path element is a reduction in dispersion. Dispersion can also be minimized by appropriate selection of the material of which the prism is fabricated.

BRIEF DESCRIPTION OF THE DRAWINGS

A better understanding of the operation and advantages of the invention is afforded by the detailed description and the following drawings, in which a common set of references numerals are identified.

DETAILED DESCRIPTION OF THE PREFERRED EMBODIMENTS

The invention provides a scanning optical delay line for an interferometric system. The scanning optical delay line uses reinsertion to provide a higher duty cycle and/or greater linearity, in an application that can provide a high scan rate for optical coherence tomography applications.

In the context of this invention, it should be noted that arrangements of optical devices, mechanical devices etc. are inherently imperfect. When Applicant refers to geometric idealizations lines, planes, directions, orthogonality, planar surfaces, parallel lines, etc., these are only achieved in limited approximation in operative embodiments, and the person of ordinary skill will understand that these terms are only intended to be limiting within reasonable limits.

Theory

Figure 1:
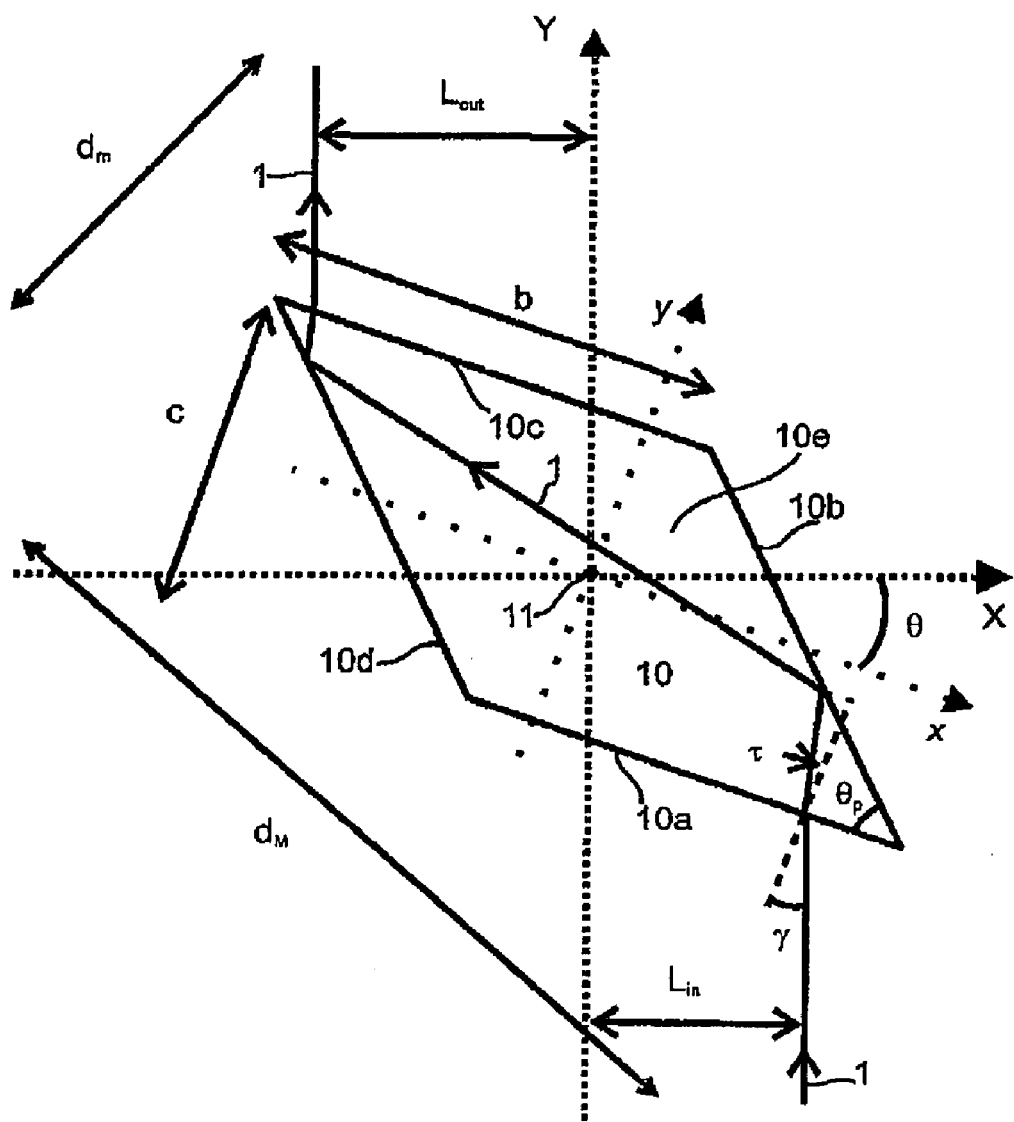
FIG. 1 is a schematic plan view of an optical path through a prism mounted for rotation about its centroid.

FIG. 1 illustrates a prism 10 rotating in an x-y plane around an axis 11 passing through its centroid. The axes x and y define coordinates (lower case letters) in the reference frame of the prism 10. The axes X and Y (capital letters) define coordinates in a reference frame of the laboratory. The angular position of the prism 10 is determined by an angle θ between the axes x and X, defined positive in the counter-clockwise direction from the X axis. The prism 10 is characterized by a characteristic angle $\theta_p$, dimensions b and c, a height d (not in view) and a refractive index $n_p$. The faces of the prism 10 are identified as 10a,b,c,d, and e. Face 10a is serving as a front, face 10c is serving as a back, and faces 10b,d are serving as side walls that provide internal reflection of an incident beam 1. The prism 10 also has a top parallelogram base 10e and a bottom (not in view) parallelogram base that has the same shape as the top parallelogram base 10e.

In such a configuration, the incident beam 1 propagating at a fixed distance $L_{in}$ from the rotation axis 11, the exiting optical beam is parallel to its initial direction when the prism 10 is oriented in a specific, relatively small, angular range if the beam is incident at a range of distances $L_{in}$ that varies between one half a minimum diagonal $d_m$ and one half a maximum diagonal $d_M$ of the parallelogram bases from the rotation axis 11. It will be understood herein that the rotation axis 11 is perpendicular to a plane in which the beam 1 is transmitted, and that accordingly the distance to the rotation axis 11, is a distance between the nearest points on a line the beam 1 follows, and the axis 11.

This angular range is covered twice per revolution as the front and back faces (10a,c) alternate during rotation. Outside the allowable range of angular values, one of two events occurs: the beam exits in a direction different from its initial direction, or the beam is not intercepted by the prism.

It will be appreciated by those skilled in the art that it is only when the optical path length is substantially linearly varying that the optical delay path is operating, and outside of the angular range, the light is not useful for correlation. The duty cycle of the scanning optical delay line is therefore tied to twice the angular range in this embodiment. Additionally, reduced nonlinearity of the resulting scanning optical delay line is possible at the expense of shortening the duty cycle. The nonlinearity is evaluated below by computing the variation in percentage of the variation of optical path length with the incidence angle ($dl_p/d\theta$) over the range covered by the delay line.

The beam 1 first encounters a face 10a with an incidence angle γ, and is refracted with an angle τ. According to Snell's law:

$$\tau = \arcsin\lfloor \sin(\gamma)/n_p \rfloor \qquad (1)$$

After a single reflection on each of faces 10b and 10d, the beam 1 is refracted again through face 10c and exits parallel to its initial direction and at a distance $L_{out}$ from the rotation axis 11. The angles γ and τ in FIG. 1 are defined positive in a counterclockwise direction from a normal of the front face 10a. For the case depicted in FIG. 1, θ<0, γ>0, and γ=−θ. The optical path length $l_p$ relative to that in absence of the prism, is given by the expression:

$$l_p = n_p \left\{ \frac{c}{\cos} + b\frac{\sin(\theta_p)}{\cos(\tau+\theta_p)}\left[1 + \frac{\cos(2\theta_p + \tau)}{\cos(\tau)}\right]\right\} - \qquad (2)$$
$$c[\cos(\gamma) + \tan(\tau)\sin(\gamma)] -$$
$$b\frac{\sin(\theta_p)\sin(\gamma)}{\cos(\tau+\theta_p)}[\cos(2\theta_p+\tau)\tan(\tau) + \sin(2\theta_p+\tau)].$$

The optical path length $l_p$ in Eq. (2) only depends on the properties of the prism 10 and on the orientation of the prism relative to the incoming beam 1. It is independent of the entry point of the beam 1, as long as the beam 1 is intercepted by the prism 10, and exits the prism 10 parallel to its initial direction after undergoing two internal reflections. Because of this entry point independence a scanning optical delay line can be made that provides robust operation, and easy alignment.

In most of the embodiments discussed herein, the prisms are rhombic prisms (i.e. having sides of equal length), chiefly because of their availability. However as the equation 2 shows, any prism having the shape of a parallelogram prism (i.e. for any values of b, c, and $\theta_p$) can be used.

The conditions for Eq. (2) to apply can be expressed in allowable range of values for the coordinates $x_0$ and $x_3$ of the entry and exit points in the reference frame of the prism. The coordinate $x_3$ is given by:

$$x_3 = x_0 - c\tan(\tau) - b\frac{\sin(\theta_p)}{\cos(\tau+\theta_p)}[\cos(2\theta_p+\tau)\tan(\tau) + \sin(2\theta_p+\tau)]. \qquad (3)$$

The following conditions on the $x_0$ and $x_3$ coordinates insure that the ray hits the front face 10a and exits through face 10d while being reflected once on faces 10b and 10d:

$$\frac{1}{2}\left[-b + \frac{c}{\tan(\theta_p)}\right] < x_0 < \frac{1}{2}\left[b + \frac{c}{\tan(\theta_p)}\right] \text{ and} \qquad (4)$$
$$x_0 > \frac{1}{2}\left[b - \frac{c}{\tan(\theta_p)}\right] + c\tan(\tau)$$

$$-\frac{1}{2}\left[b + \frac{c}{\tan(\theta_p)}\right] < x_3 < \frac{1}{2}\left[b - \frac{c}{\tan(\theta_p)}\right] \text{ and} \qquad (5)$$
$$x_3 < \frac{1}{2}\left[\frac{c}{\tan(\theta_p)} - b\right] - c\tan(\tau).$$

Figure 2:
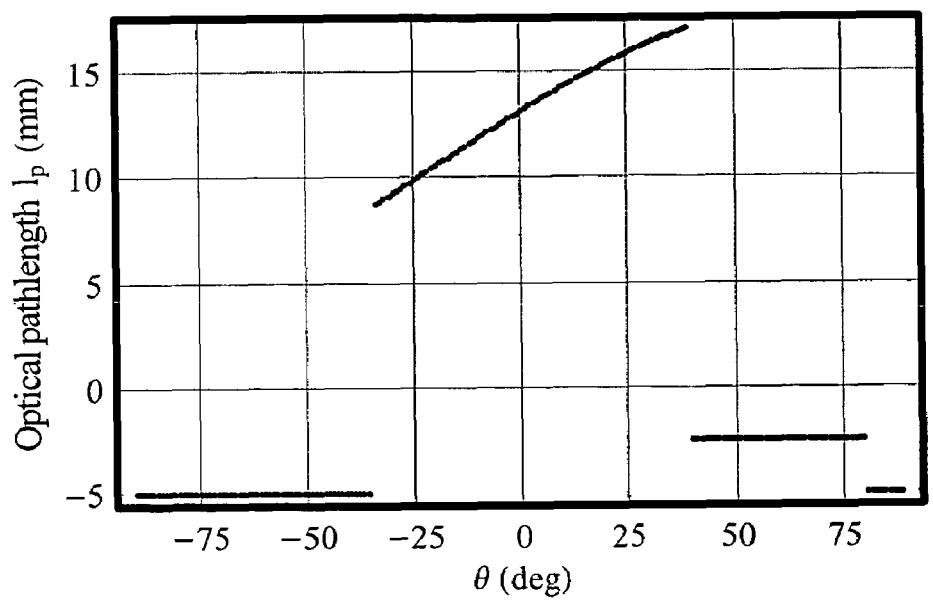
FIG. 2 is a graphical representation of optical path length $l_p$ as a function of an angle of incidence in accordance with the embodiment of FIG. 1.

FIG. 2 shows the variation in optical path length as a function of the angle γ for a beam 1 propagating at a distance $L_{in}$=3.5 mm from the axis of rotation 11 for a prism with $n_p$=1.5, c=5 mm, b=7.07 mm, and $\theta_p$=45°. The optical path length is evaluated relative to that in absence of the prism. A negative value of −5 mm for the path length indicates that the beam does not intercept the prism, while a negative value of −2.5 mm indicates that the beam is intercepted by the prism 10 but does not exit parallel to the incoming beam. It will be appreciated that for a range of angles between about −34° and about 39° there is a monotonic rise in optical path length, from about 8.7 mm to about 17.0 mm.

Figure 3:
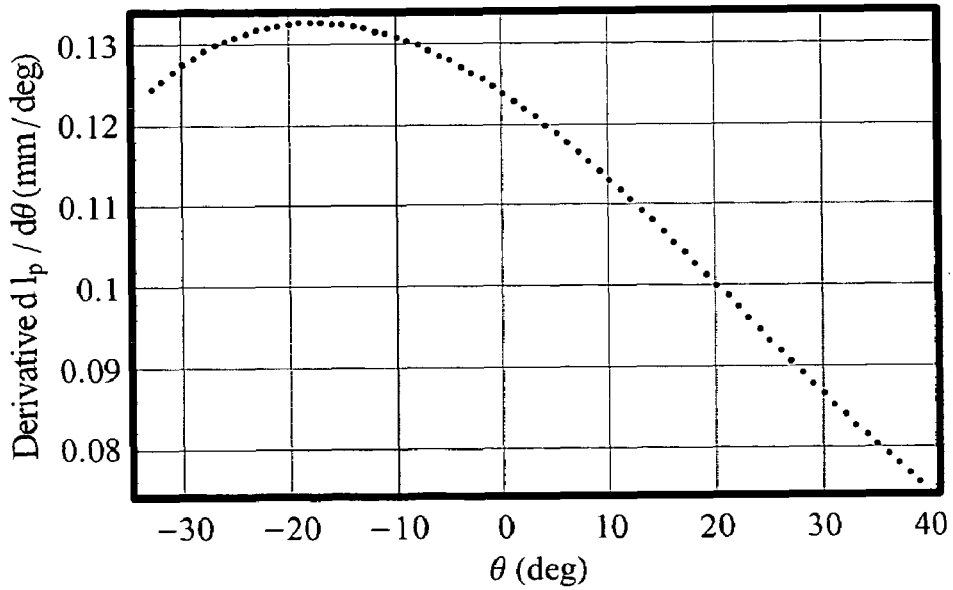
FIG. 3 is a graphical representation of a variation of a path length difference with the angle of incidence ($dl_p/d\theta$) in accordance with the embodiment of FIG. 1.

FIG. 3 illustrates the derivative of the optical path length as a function of the angle γ. Ideally, this variation would be constant, indicating that the optical path length varies linearly with the angular position θ. However, FIG. 3 clearly shows that the variation in the derivative is quite substantial for the specific case if one considers the whole angular range available.

As noted above, the optical path length $l_p$ varies only with the angle between the beam 1 and the front face 10a, and not with the distance $L_{in}$, but the distance $L_{in}$ determines the angular range over which the beam enters and exits the prism correctly. We thus now consider the prism rotating around its center of mass for various distances of the incoming beam 1 from the rotation axis.

Figure 4:
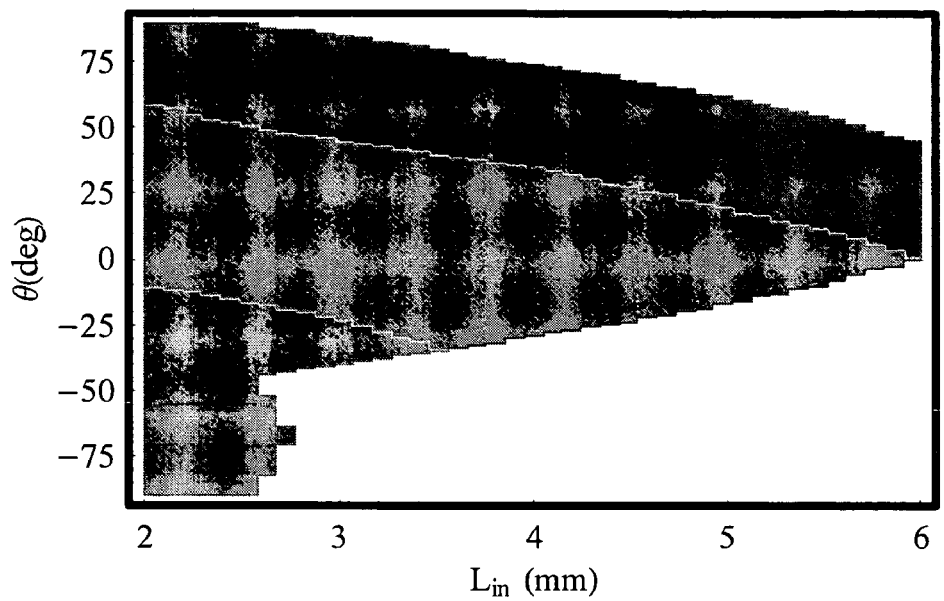
FIG. 4 is a graphical representation of a range of angles of incidence over which the transmitted beam exits a prism as a function of separation of an incidence line from an axis of rotation $L_{in}$.

FIG. 4 is a graph showing transmission properties of the incident beam as a function of angular position θ, and separation ($L_{in}$) from the rotation axis 11. In the blank region, the prism 10 does not intercept the beam 1. In the darkest region the beam enters the prism 10 and exits parallel to its initial direction. The intermediate (light gray) region corresponds to the case where the beam 1 is incident the prism 10, but the beam exits in a direction different from its original direction. This happens if a different sequence of internal reflections occurs. The graph represents the properties of a prism with parameters $n_p$=1.5, c=5 mm, b=7.07 mm and $\theta_p$=45° rotating around its centroid.

Figure 5:
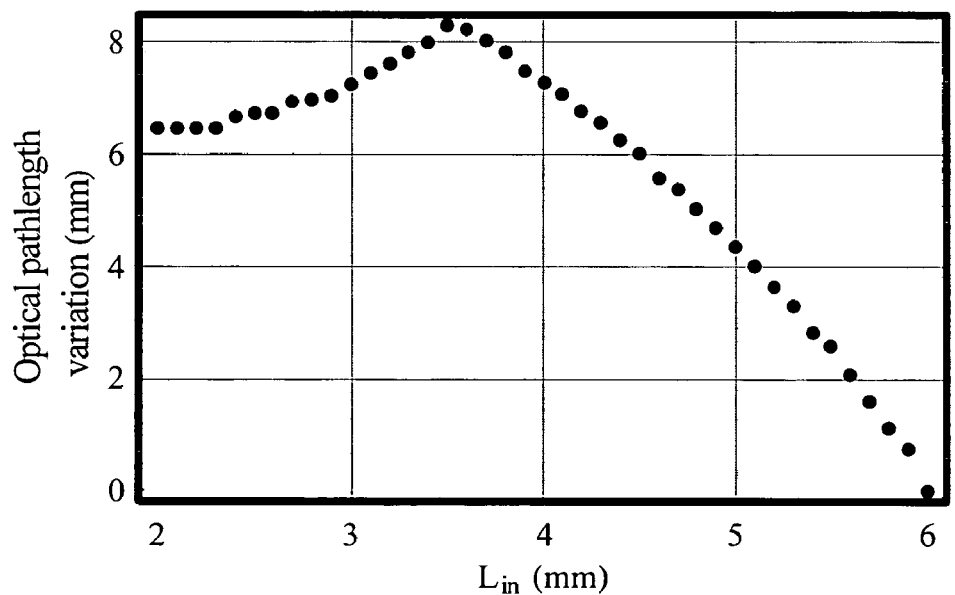
FIG. 5 is a graphical representation of an optical path length variation resulting from a usable angular range as a function of the distance $L_{in}$.

FIG. 5 schematically is a graph illustrating a variation in optical path length scan range resulting from the rotation of the prism for the various values of $L_{in}$. A largest scan range is obtained for $L_{in}$=3.5 mm.

Figure 6:
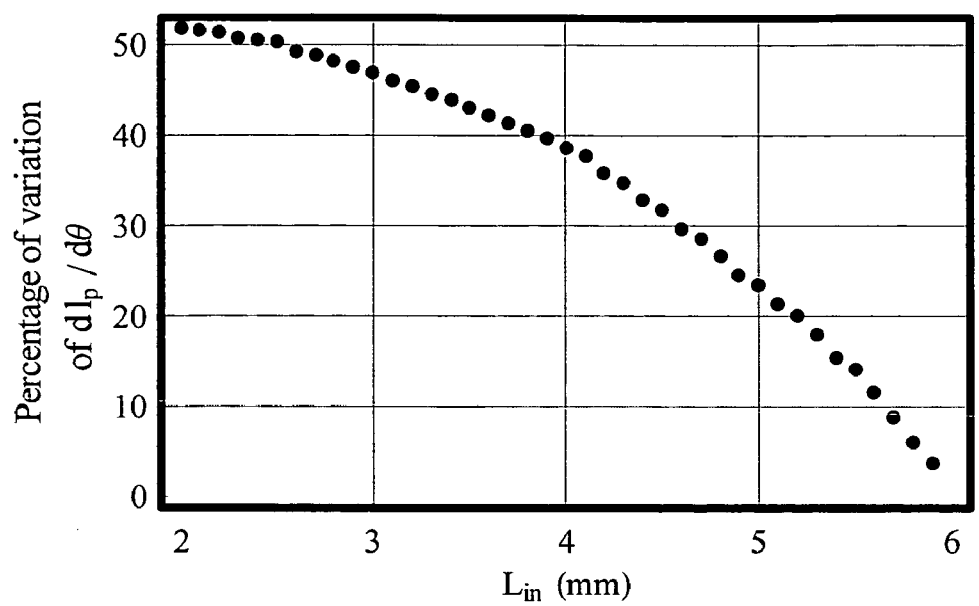
FIG. 6 is a graphical representation of a percentage of variation of the derivative $dl_p/d\theta$ over the usable angular range as a function of the distance $L_{in}$.

FIG. 6 illustrates the percentage of variation in derivative ($[(dl_p/d\theta)_{max}-(dl_p/d\theta)_{min}]/(dl_p/d\theta)_{max}$ for each value of $L_{in}$. It shows that reasonable variations (less than 10%) are obtained for values of $L_{in}$ slightly smaller than 6 mm. FIG. 5 also shows that for those values of $L_{in}$, the variation in optical path length is rather small.

In the case of the prism, if the parameters that maximize the optical path length variation are chosen ($L_{in}$=3.5 mm), we obtain a duty cycle of 41% with a nonlinearity of 43%.

Application

In accordance with the invention, improved duty cycle, linearity of variation, and/or scan range of a scanning optical delay line are provided. This is accomplished by reuse of the angular range by reinsertion of the beam.

FIGS. 7a,b schematically illustrate a first embodiment of the invention showing how multiple insertions of the beam may be achieved. A prism 10, is mounted for rotation about an axis 11 passing through its centroid, orthogonally to parallelogram top and bottom bases of the prism 10, as in FIG. 1. The scanning optical delay line assembly also includes two mirrors 17, 18 each for reflecting (by 180°) beams passing through the prism 10 at two ranges of angular positions, and a third mirror 19 for reflecting the beam from a line of incidence 12 with the prism 10 over a first range of angles, and a reinsertion line 13 that intersects the prism 10 over a second range of angular positions.

In FIG. 7a, a beam 15a exits an optical coupler 16 along a line of Incidence 12. Incidence line 12 is directed orthogonally to the rotational axis 11 from which it is offset by the distance $L_{in}$, as defined in FIG. 1. The distance $L_{in}$ is Intermediate one half a major diagonal ($d_M$) of the prism 10 and one half a minor diagonal ($d_m$) of the prism 10 so that during rotation the prism 10 periodically intersects the line of incidence 12. The beam 15a propagates towards the prism 10. As shown in FIG. 7a, the beam 15a is incident on the prism 10, is twice reflected, and exits toward a reflective surface 18, in a direction parallel to the line of incidence 12. The reflective surface 18 may be a retroreflector, or a mirror that is disposed in a direction perpendicular to the line of incidence 12. The reflective surface 18 extends in the X direction a range of distance to cover $L_{in}+L_{out}$ from the incidence line 12. While $L_{in}$ is a constant, it will be appreciated that $L_{out}$ varies with θ. Reflective surface 18 reflects beam 15a to retrace the same path. As such, reflective surface 18 is an end of the scanning optical delay line. In other embodiments the scanning optical delay line is of a transmission type, and instead of retroreflecting the beam, the end serves to couple the beam 16a with a sample beam 15a for coherence measurement. In the illustrated retroreflective embodiment, however, the beam 15b again passes through prism 10, and is finally collected by the optical coupler 16. The optical path length traversed by the propagating optical beam is related to the orientation of the prism 10.

When the angular position of prism 10 is such that the prism 10 does not intersect the line of incidence 12, the beam 15a becomes available for reinsertion into the prism 10. This is depicted in FIG. 7b where the same prism 10 has been rotated by 90° in a counter-clockwise direction. The beam 15a first follows the incidence line 12 past an obtuse corner of the prism 10, and then is redirected by mirror 19 towards onto a reinsertion line 13. The reinsertion line 13 is separated from the rotational axis 11 by $L_{in}$, and is directed orthogonally to the rotational axis 11, and accordingly the reinsertion line 13 is equivalent to the incidence line 12 up to a phase offset. As shown in FIG. 7b, the beam 15a passes through the prism 10 exiting parallel to the reinsertion line 13. The beam 15c is reflected by a surface 17 that is disposed to retroreflect the beam 15c causing it to retrace its path through the prism 10, and along the reinsertion line 13, to the incidence line 12.

For the embodiment depicted in FIGS. 7a,b, good characteristics have been obtained for the scanning optical delay line with a material of high refractive index, for example, using a ZnSe prism with dimensions b=4.24 mm, c=3 mm, $\theta_p$=45° and with a refractive index of 2.46 at 1310 nm. It will be appreciated that this prism 10 has a different refractive index than the previous examples, resulting in greater linearity. If the first line of incidence passes a distance of $L_{in}$=2.8 mm from the rotation axis, a scan range of 4.5 mm, a duty cycle of 71% and a nonlinearity of 14% can all be produced.

A second embodiment of the invention uses off centroid rotation which improves the selection of the range of angles the line of incidence makes with a front face of the prism. By rotating off centroid, only one surface is used as the front surface, and consequently there is no alternation of front and rear surfaces to double the number of times the beam is inserted in the prism, per cycle. Accordingly multiple prisms may be used to improve the duty cycle.

Figure 8A:
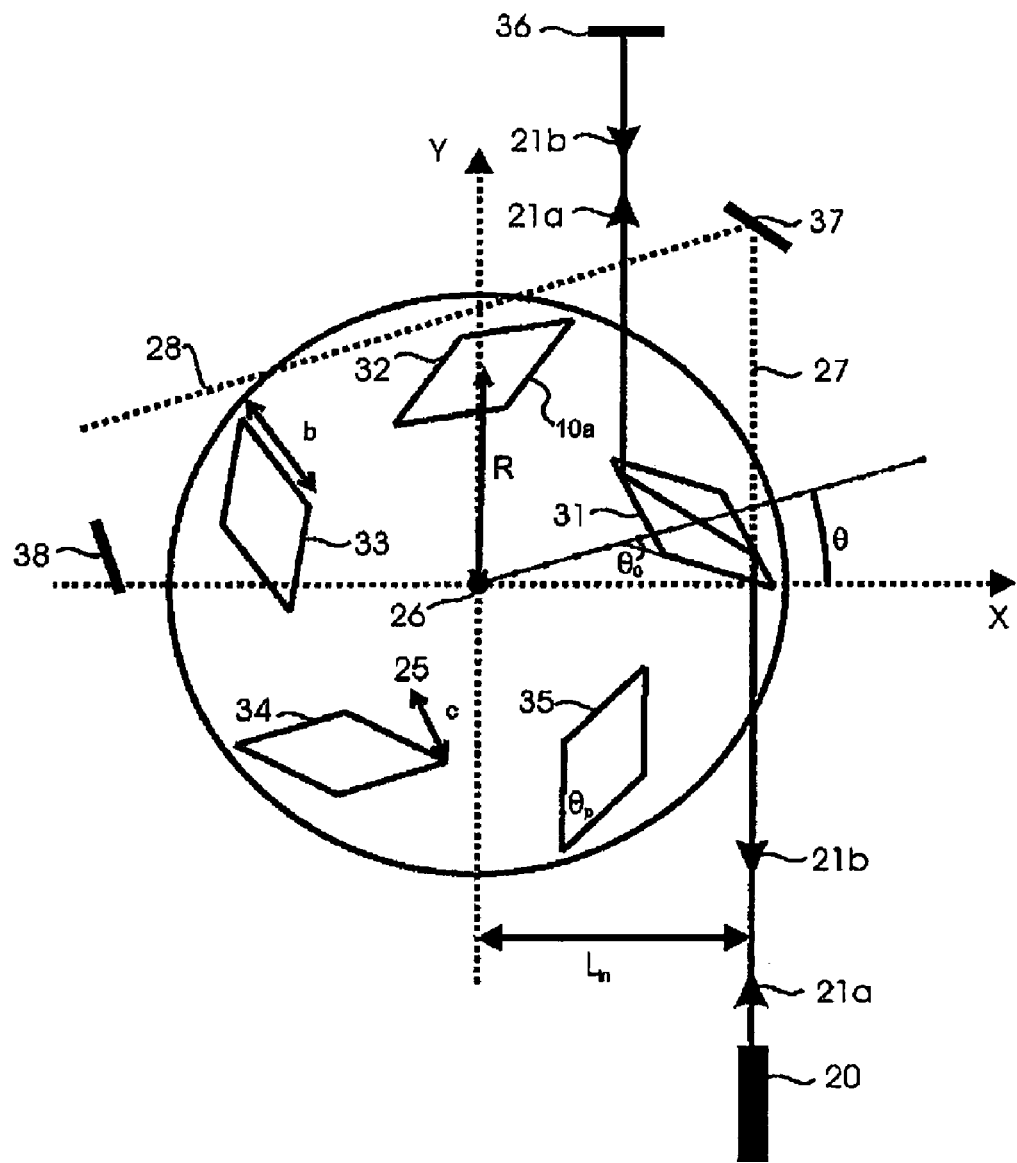
FIGS. 8a and 8b are two schematic plan views of an embodiment of a scanning optical delay line with five prisms distributed along the circumference of a disk showing insertion on an incidence line, and a reinsertion line, respectively.

An example of the second embodiment is schematically illustrated in FIGS. 8a,b. The scanning optical delay line includes five prisms 31-35 fixed on a rotating disc 25. Each of the prisms 31-35 is oriented in a rotationally symmetric manner so that they all provide substantially the same range of angular variances with respect to lines of incidence 27 and reinsertion 28. Basically this embodiment has two additional parameters for optimization: a radial distance R of a centroid of the prism from the rotational axis; an angle $\theta_0$ between a radial line from the rotational axis through the centroid of the prism, and a front face of the prism. In any case the prisms are arrayed with an acute corner radially distant the axis of rotation, so that the incidence 27 and reinsertion 28 lines Intersect an arc swept by the acute corner. Once the parameters R, $\theta_0$, b, c, $\theta_p$ and $n_p$ are chosen, a maximum number of prisms, $L_{in}$, an angle between the incidence 27 and reinsertion 28 lines, and positions of reflecting surfaces 36,38 for reinsertion, can be chosen to optimize the duty cycle and linearity of the scanning optical delay line.

FIG. 8*a* shows a scanning optical delay line with five prisms 31-35, fixed to a disc 25, rotatable around the center of the disc 26. Each prism 31-35 has a center of mass at a radius R from the center of the disc 26. The orientation of each prism 31-35 is determined by an angle $\theta_0$ that the front face 10*a* of the prism makes with respect to a radial line passing through the center of mass of the prism, $\theta_0$ being defined positive in a counterclockwise direction from the radial line. Surrounding the disc 25 are a plurality of mirrors 36, 37, 38. The mirrors 36-38 are oriented to reflect beams as described below.

An angle $\theta$ is defined between a radial line from the center 26 of the disc 25 passing through the centroid of the prism and the X-axis, the angle $\theta$ being defined positive in a counter-clockwise direction from the X-axis. While FIGS. 8*a,b* illustrate a specific embodiment where 5 prisms are used, it will be appreciated that different numbers of prisms could be used as long as the paths through each prism doesn't intercept another prism, which happens when the prisms are too densely disposed.

A beam 21*a* exits an optical coupler 20 that both delivers and collects light from an interferometric system. The beam 21*a* propagates towards the delay path assembly. During a part of the cycle of rotation where one of the prisms (i.e. an active prism 31) intersects the incidence line 27, as shown in FIG. 8*a*, the beam 21*a* is intercepted by prism 31 and exits parallel in direction to the insertion line 27 toward mirror 36. Mirror 36 is aligned in such a way that the reflected beam 21*b* follows the exact inverse path as beam 21*a*. Accordingly the mirror 36 is perpendicular to the beam 21*a* but displaced in the X direction to accommodate for the lateral displacement of the beam. The beam 21*b* again passes through prism 31, and is finally collected by the optical coupler 20. The optical path length traversed by the propagating optical beam 21 depends on the instantaneous orientation of the prism.

Figure 8B:
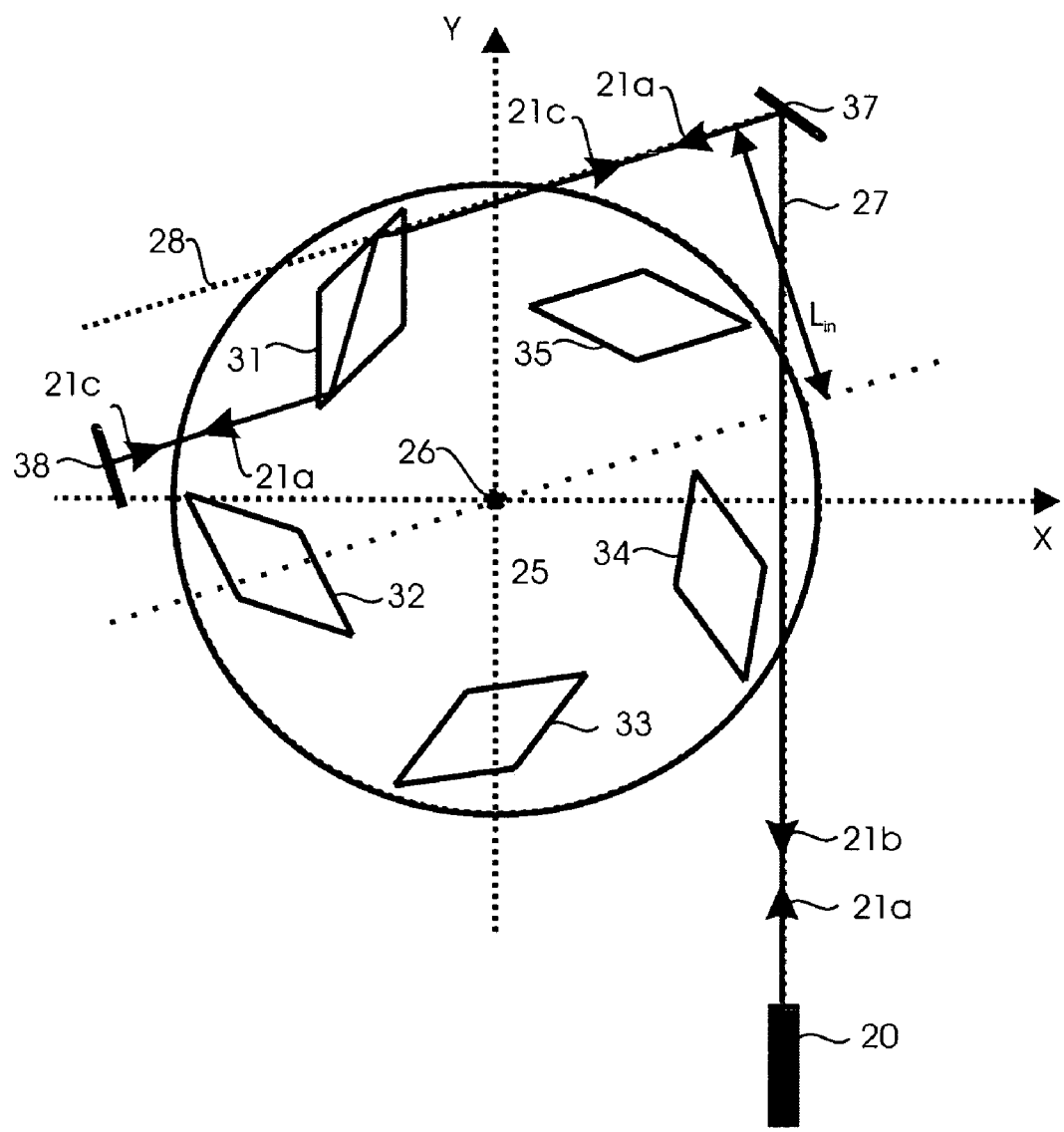

When the beam 21*a* is not directly intercepted by the prism, it becomes available for reinsertion into the disc 25. This is depicted in FIG. 8*b* where the same delay path assembly is shown rotated by 180° in a counter-clockwise direction. The beam 21*a* first crosses the disc 25 without intercepting any prism, and is therefore redirected by mirror 37 onto reinsertion line 28. Prism 31 is in position on the reinsertion line. The mirror 37 is at an angle with respect to the incidence line 27 so that beam 21*a* is directed along the reinsertion line 28 passing a same distance from the center of the disc 26 as the initially launched beam 21*a*. Beam 21*a* exits prism 31 parallel to its direction prior entering the prism 31, and is reflected 180° by mirror 38. The reflected beam 21*c* follows the reciprocal path of beam 21*a* to finally be collected by the optical coupler 20. As shown in FIG. 8*b*, reinsertion at a given prism occurs 108° after the direct insertion. This reinsertion could have occurred at other angles like 36°, 180°, 252°, or 324°, while providing similar performance. For a different arrangement of prisms, the possible angles would also be different.

In the embodiment presented in FIGS. 8*a,b*, during the period of rotation of the disc 25, each prism is used twice: once on each of the incidence and reinsertion lines. The parameters of the scanning optical delay line can be chosen to optimize the duty cycle and linearity of the scanning optical delay line. BK7 is found appropriate for operation around 1.3 µm with a bandwidth of a several tens of nanometers. Using commercially available BK7 prisms ($n_p$=1.5037 at a wavelength of 1310 nm), with the dimensions c=5 mm, b=7.07 mm, $\theta_p$=45°, we can use the results presented in FIGS. 3 and 4 as a guideline. To optimize the duty cycle, the beam 21*a* should intercept each prism over angular ranges of about 36° (360/2n, where n is the number of prisms). From FIG. 3 it is determined that to minimize the nonlinearity, the angular range should be centered on an angle $\gamma$=17°. From FIG. 4, the beam should enter each prism when the beam is at a distance of about 3.5 mm from the center-of-mass of the prism (i.e. R+3.5 mm from center 26), and exit when it is a distance a little over 6 mm (i.e. R+6 mm from center 26). The optimal configuration is obtained for a radius R=14 mm, and an orientation of each prism of $\theta_0$=−35°, and a value of $L_{in}$=17.5 mm.

Figure 9:
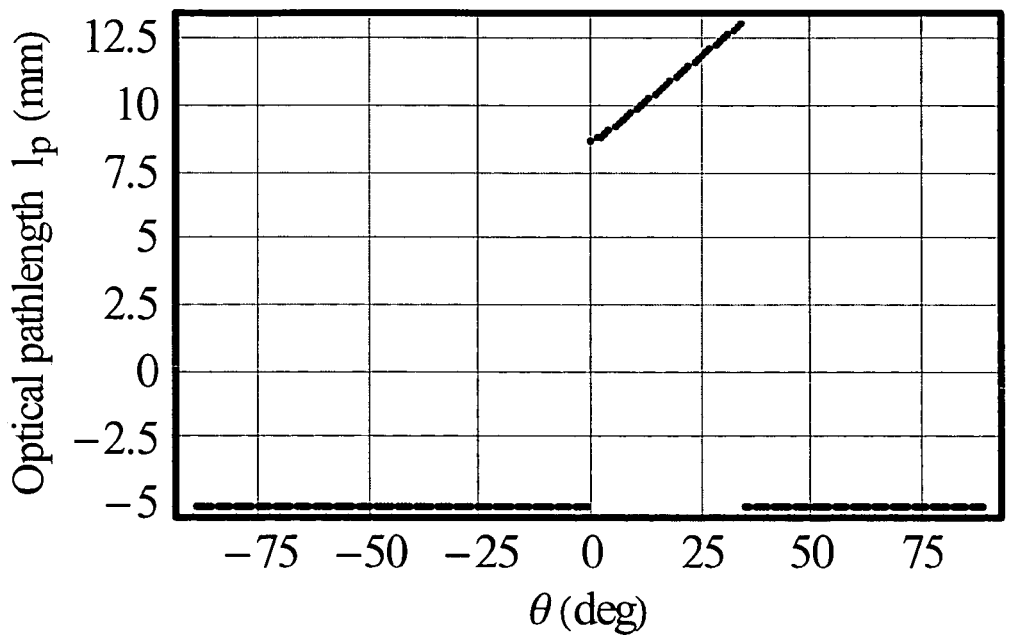
FIG. 9 is a graphical representation of optical path length as a function of angular position θ of a prism for the embodiment shown in FIGS. 8a,b.

A graphical representation of the resulting optical path length variation for a single prism as a function of the angle $\theta$ for one of the prisms is shown in FIG. 9. The optical path length in FIG. 9 corresponds to a single-pass through the prism, and therefore illustrates half the total path length between the exit and reentry in the optical coupler 20 in FIG. 7. The use of one half the total path length is standard in the field of interferometry where the sample arm will also be in a retroreflecting configuration, as is common in optical coherence tomography. The prism is active between angles $\gamma$ from 1.1° and 34.1°. Outside this angular range, an optical path length value of −5 mm corresponds to the case where the beam does not intercept the prism, the beam is thus available for reinsertion or to be intercepted by the preceding or following prism. The resulting duty cycle of the scanning optical delay line can thus be more than 90%.

Figure 10:
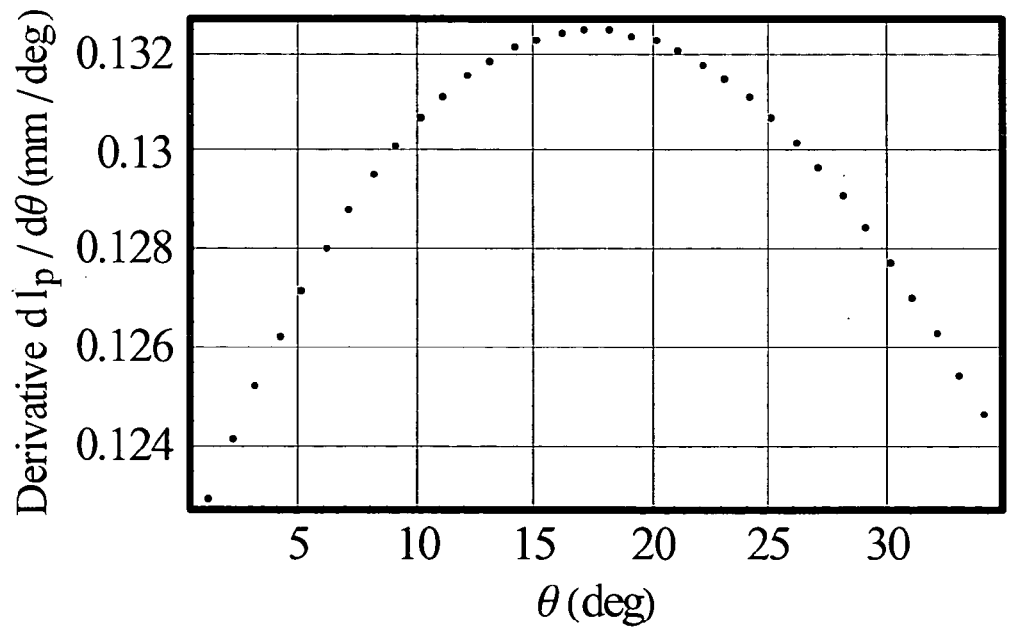
FIG. 10 is a graphical representation of a variation of the derivative $dl_p/d\theta$ as a function of the angular position θ of a prism for the embodiment shown in FIGS. 8a,b.

FIG. 10 graphically illustrates the variation of the derivative $dl_p/d\theta$ over the angular range, showing that the nonlinearity is small, i.e. about 6%. Accordingly, the embodiment of FIGS. 8*a,b* can provide an improved linearity of the optical path length as a function of angle $\gamma$, by using an angular range corresponding to a most linear portion of the curve.

Furthermore it will be noted that a sampling rate of more than 8,000 samples/s with a 50,000 rpm rotating motor is possible. These numbers are on par with high-end state-of-the art scanning optical delay lines but improve over the prior art in terms of ease of alignment and robustness.

Figure 11:
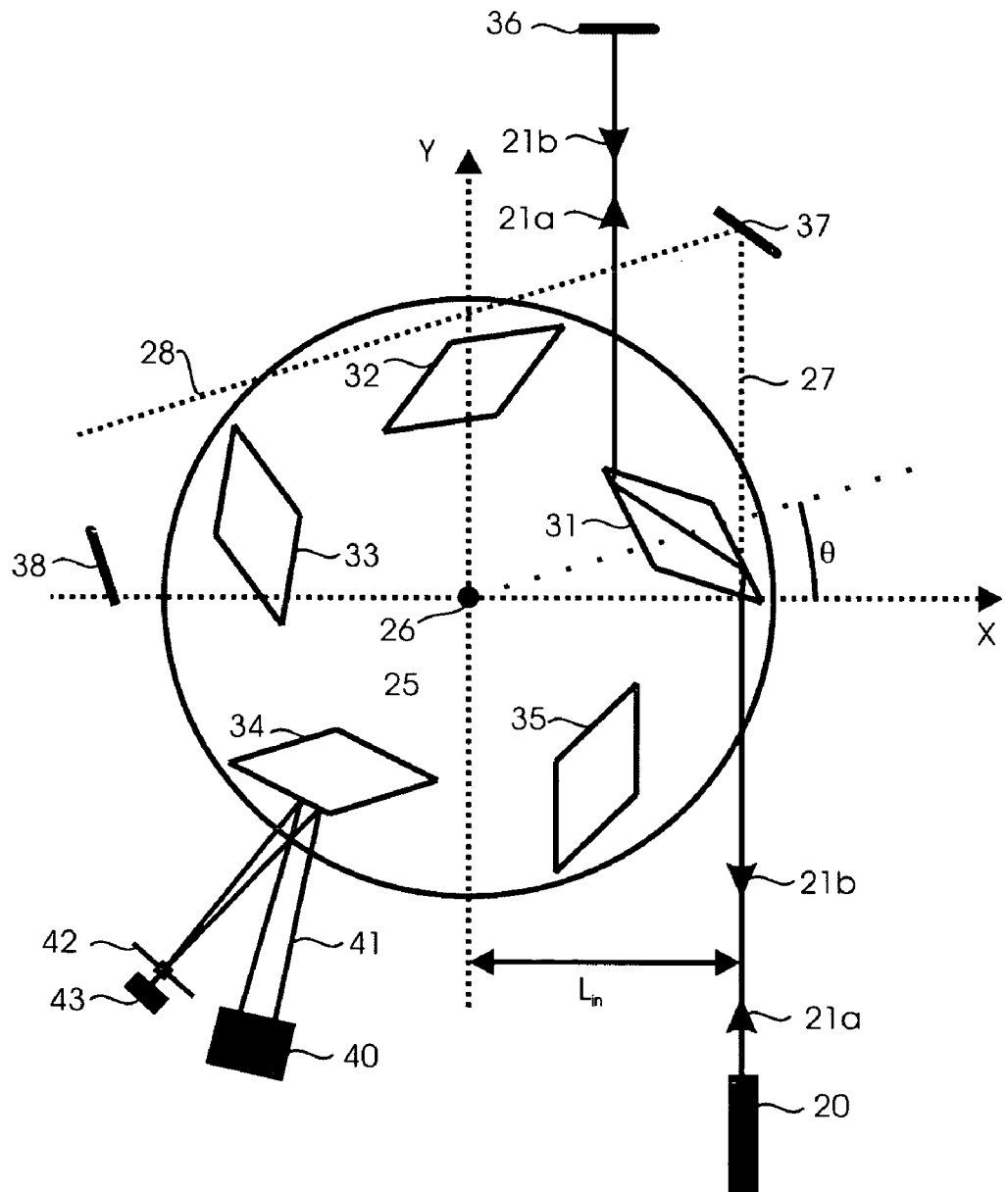
FIG. 11 is a schematic plan view of the embodiment of FIGS. 8a,b with the addition of a synchronization detector.
Figure 12:
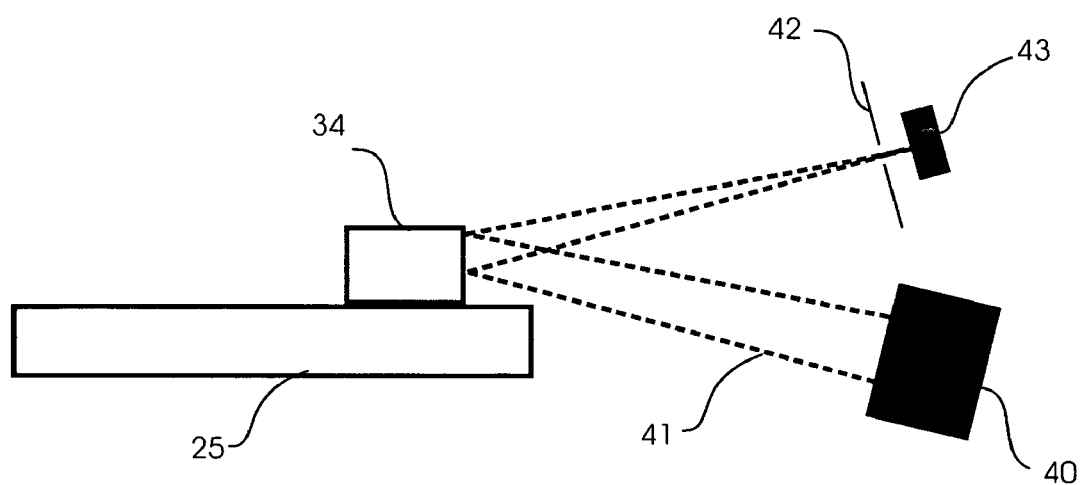
FIG. 12 is a schematic side view of the synchronization detector of FIG. 11.

FIG. 11 is a schematic top plan view of a scanning optical delay path that includes the disc 25 and prisms 31-35 of FIGS. 8*a,b*, with the addition of a marking system. FIG. 12 shows an active part of the marking system and scanning optical delay path in an elevation view. Like reference numerals identify like features of the delay path assembly, and descriptions of these are not repeated here. An optical source 40 emits a beam 41 of light into the disc 25. The beam of light 41 is focused to gather light at a distance of the slit 42. The beam 41 meets front walls of an adjacent one of the prisms 31-35 (e.g. prism 34 as shown), depending on an angular position of the disc 25. The angle of incidence of the beam 41 on the front wall ensures that sufficient light is reflected from the face of the adjacent prism. At specific angular positions of the disc 25, like the one depicted in FIG. 11, the optical beam 41 is reflected from the face at a specific angle that passes through a narrow slit 42 and is detected by a detector 43.

As can be better seen in FIG. 12, the beam 41 from source 40 is directed to the prism at an angle from the plane of the disc 25 and as are the slit 42 and detector 43. This configuration allows beam 41 to hit the upper part of the prism 34, ensuring that only the reflection from the front face is sent to the detector. A refracted part of beam 41 enters the prism and is partly reflected internally by the other faces but is not sent back towards the detector, to avoid spurious detections that could degrade the quality of the synchronization signal. The source 40 and detector 43 are shown at different radial positions in FIG. 11, but since they are at different height, they could be put one on top of the other to provide a more compact system. Because the beam 41 is reflected by a revolving prism, the angular velocity is twice that of the prism thus providing a very precise synchronization signal. This precision is enhanced by the use of a very narrow slit, and a highly focused beam 41. Additionally, the synchronization signal is produced from a detector signal from the detector 43, and the detector signal can be fitted to a function, such as a Gaussian function, to determine more precisely a center, to further increase the precision. Finally, the system can be positioned relative to the scanning optical delay line such that the synchronization signal is detected in a dead time of the scanning optical delay line (i.e. during a time outside of the duty cycle), to avoid interference with the scanning operation.

In certain embodiments, the marking system can determine which of the prisms 31-35 is detected. This can be accomplished in two ways: the detected reflection from each prism may have a different amplitude caused by imperfections in positioning of the prism; or by variations in the reflective properties of the faces of the prisms that were intentionally created. As a result, at each revolution of the disk, five signals of different amplitudes are detected by detector 42 and this information can be used to identify which prism is active under direct insertion or under reinsertion at a given moment. It will be noted that the number of signals detected correspond to the number of prisms, which is five in the current example. It will be appreciated that in alternative embodiments a different number of samples could also be taken, and that these samples could be associated with apertures or markings on the disc 25, one or more attachments to the prisms, etc. It is advantageous to use the front face for detection so that if one of the front faces is moved, the marking system can declare misalignment.

If each of the prisms is identified by the marking system, the detector can send a synchronization signal to a detection and analysis system, which can then identify intervals of a coherence signal output by the interferometer that correspond to a sample (i.e. time gating of the interferometer output), and can apply a corresponding calibration for each sample. As will be evident each sample is produced by a corresponding one of the prisms, produced along either the incidence or reinsertion lines. As there may be slight differences in $L_{in}$ between the incidence and reinsertion lines, it may be preferable that there be one calibration for each prism along each insertion line. Accordingly the synchronization signal permits accounting for small departures from ideal positioning in prism positioning during assembly. This increases the precision of the scanning optical delay line.

Alternatively, the synchronization of the scanning optical delay line can be performed by any approach that includes but is not limited to optical, electrical, mechanical, and magnetic systems. The use of synchronization signals to trigger the detection system is well known to those skilled in the art.

Figure 13:
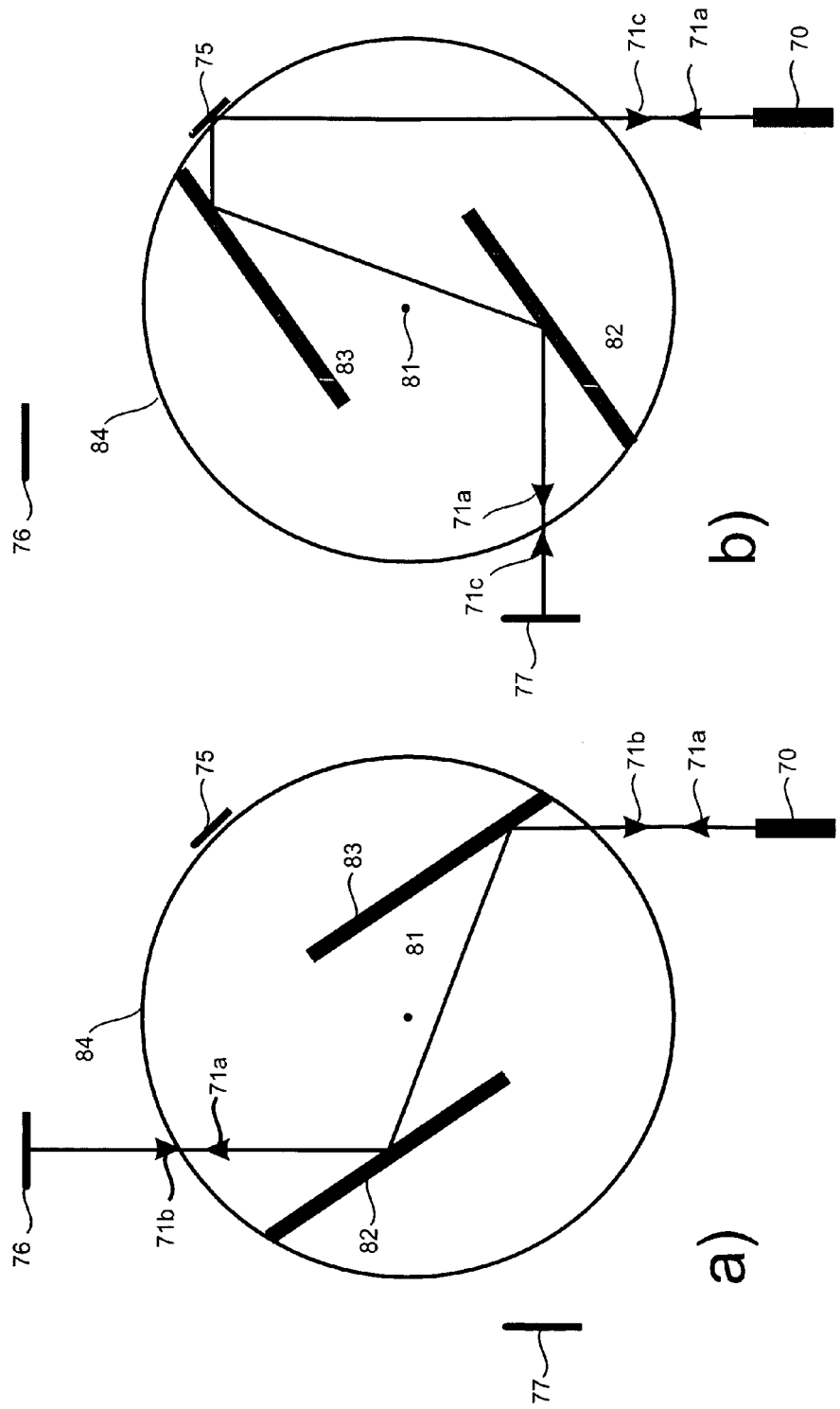
FIG. 13 is a schematic plan view of an embodiment of a scanning optical delay line using a single pair of parallel planar mirrors rotating around its centroid showing insertion on an incidence line, and a reinsertion line, respectively.

The embodiments of FIGS. 13a,b illustrate the replacement of the prism 10 with an alternative parallelogram optical path element that consists of two parallel planar mirrors 82,83. The equation of optical path length for such a parallelogram optical path element is represented with equation 2 where the index of refraction $n_p$ is set to one. The features of the parallelogram optical path element that are constant between these two embodiments are the parallel side walls, the effectively parallel front and rear, the constant index of refraction of the optical medium enclosed between the two parallel walls, and the fact that over a range of angular positions and $L_{in}$, the optical path length is substantially invariant of $L_{in}$.

Figure 7:
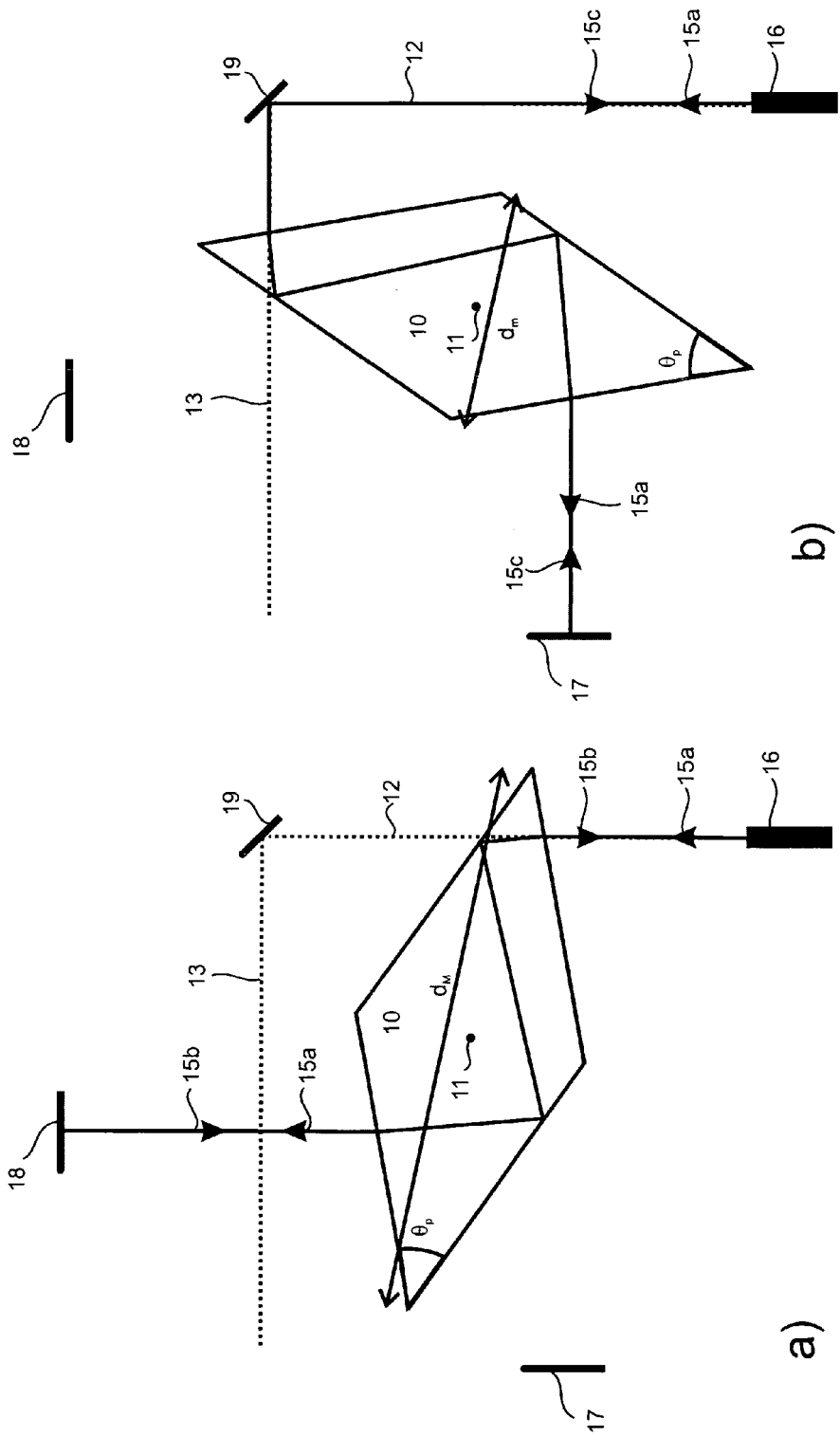
FIGS. 7a and 7b are two schematic plan views of an embodiment of a scanning optical delay line using a single prism rotating around its centroid showing insertion on an incidence line, and a reinsertion line respectively.

As the prism 10 of FIG. 7 is replaced with parallel planar mirrors 82,83 the remaining features of FIGS. 13a,b (identified by reference numbers 70, 71a,71b,71c,75,76,77, and 81) are substantially analogous to features previously identified by reference numbers 16,15a,15b,15c,19,18,17, and 11, respectively.

Parallel mirrors 82 and 83 are fixed to a plate 84 that is adapted to rotate around an axis passing through a centroid 81 of the mirrors. In operation the embodiment of FIGS. 13a,b the beam is transmitted in the same manner as that of FIGS. 7a,b except that there is no refraction of the incident beam as it enters and leaves the parallelogram optical path element in accordance with the instant embodiment. Consequently the detailed description of the path is not repeated here.

For a pair of mirrors 4.24 mm long separated by a distance of 3 mm defining an angle $\theta_p$ between a front of the parallelogram optical path element and mirror 83, and with a line of incidence at a distance $L_{in}$=2.8 mm from the centroid 81, the scan range is 2.8 mm with a duty cycle of about 40% with a nonlinearity of about 43%. The performance of such a scanning optical delay line is poorer than for the previously described embodiments, but it advantageously avoids dispersion due to the propagation in the material from which the prisms are made.

A still further embodiment can be obtained by replacing the prisms in the multiple prism assembly of FIGS. 8a,b with parallelogram optical path elements consisting of pairs of parallel mirrors. Again, this would be a good choice if one wants to avoid dispersion in the material from which the prisms are made. There will be a similar improvement in linearity and duty cycle by taking advantage of off-centroid rotation of the parallelogram optical path elements in combination with reinsertion.

Figure 14:
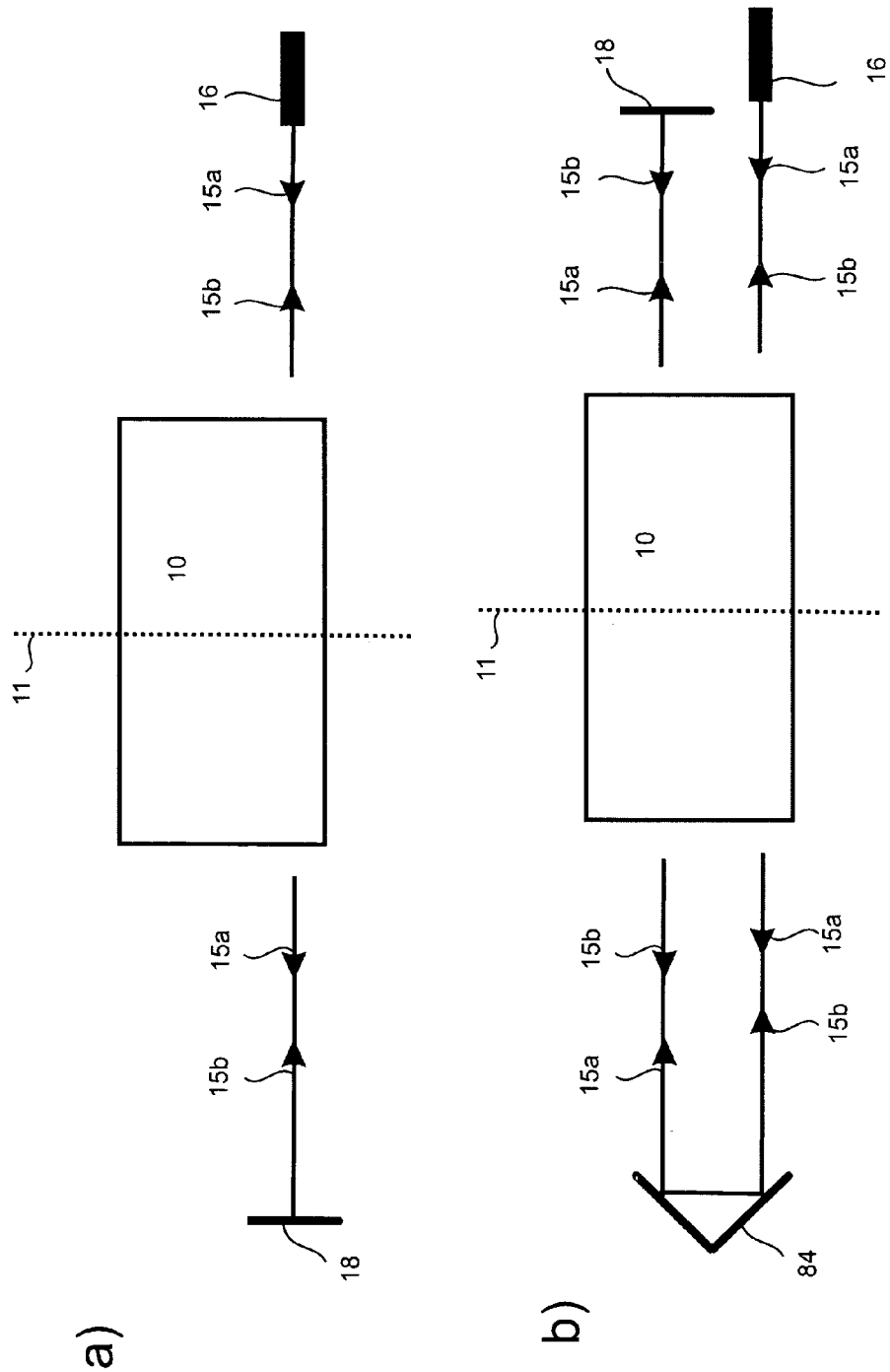
FIGS. 14a,b is a schematic partial side view of the embodiment of FIGS. 7a,b and an alternative double pass embodiment.

FIG. 14 schematically illustrates a further alternative embodiment of the invention that provides a double pass system. The principal advantage of the double pass embodiment is a depth of the scan is doubled. FIG. 14a schematically illustrates a profile view of parts of the scanning optical delay line of FIGS. 7a,b. In contrast, FIG. 14b schematically shows the addition of an offset reflector 84 consisting of a pair of mirrored surfaces that meet to form a square edge. As the square edge is substantially orthogonal to rotation axis 11, the offset reflector 84 effects substantially no offset in the plane of the incidence and reinsertion lines. This minimizes any difference in the optical path length traveled by the beam 15a,b during the two passes through the prism 10. The second path through the prism 10 ends with a retroreflecting mirror 18 as before, however retroreflecting mirror 18 is moved to a position above the optical coupler 16. While a second mirror 17 is not in view, it will be appreciated by those skilled in the art that it too is replaced by an offset reflector for similar operation.

It will be appreciated by those skilled in the art that multiple passes can equally be effected by other reflections that take the same or different paths through the prism 10. Furthermore the same double pass configuration is equally applicable to the embodiment of FIGS. 8a,b.

While the invention is described for a retroreflective-type scanning optical delay line, it will be evident to those skilled in the art that the same scanning optical delay line could equally be used in a transmission configuration scanning optical delay line by replacing retroreflective ends with transmission elements.

It will further be noted that while an advantage of the illustrated embodiments include that the reflection of the beam from the line of incidence to the line of reinsertion is performed by a single mirror, in other embodiments it may be necessary to use reflections off 2 or more surfaces to insert the beam on the reinsertion line.

It will be appreciated by those skilled in the art that a "double pass" configuration can be implemented using the proposed optical delay line for effectively doubling the optical path delay. For example, a double pass configuration may be implemented by going through the prism at different height levels along the rotation axis. The change in height level may be realized by a set of mirrors such as a corner retroreflector.

What is claimed is:

1. A method of applying a substantially linearly varying optical path length delay to an optical beam, the method comprising:
   rotating an optical path element about an axis so that the optical path element intersects an incidence line during a first fraction of each cycle of rotation;
   inserting an input beam along the incidence line so that during the first fraction of each cycle the beam enters the optical path element at a predefined range of angles over which an optical path length of the optical path element varies substantially linearly with rotation;
   reflecting the beam from the incidence line to a reinsertion line outside of the first fraction of each cycle when the optical path element does not intersect the Incidence line; and
   reinserting the beam into the optical path element along the reinsertion line that is separated from the axis of rotation a same distance as the incidence line defining a second fraction of each cycle of rotation during which the optical path length varies.

2. The method as claimed in claim 1 wherein rotating the optical path element comprises rotating a parallelogram optical path element including a pair of parallel planar reflectors defining side walls that enclose an optical transmission medium in the shape of a parallelogram prism, the rotation being about an axis that is directed orthogonal to top and bottom bases of the parallelogram prism, wherein the incidence line and reinsertion line are separated from the axis of rotation by a distance that permits intersection of an acute angle of the parallelogram but not an obtuse angle of the parallelogram, so that a beam input on the incident or reinsertion line enters a front of the parallelogram optical path element, reflects off each of the side walls, and exits the parallelogram optical path element in a direction parallel to the incidence or reinsertion line.

3. The method as claimed in claim 2 wherein rotating the parallelogram optical path element comprises rotating a prism having top and bottom parallelogram bases, the side walls at which the beam is reflected, and a front wall and a rear wall at which the beam is refracted.

4. The method as claimed in claim 2 wherein rotating the parallelogram optical path element further comprises rotating the parallelogram optical path element about an axis passing through a centroid of the parallelogram, which is separated from the incidence line by a length that is intermediate one half a minor diagonal length of the parallelogram and one half a major diagonal length of the parallelogram, so that in each cycle the front and back walls alternate function with respect to both the incidence line and reinsertion line.

5. The method as claimed in claim 2 further comprising reflecting the beam from the reinsertion line to a third insertion line outside of the first and second fractions of the cycle and inserting the beam into the optical path element along the third insertion line that is separated from the axis of rotation an equal distance as the incidence and reinsertion lines.

6. The method as claimed in claim 2 wherein rotating the parallelogram optical path element further comprises rotating a plurality of parallelogram optical path elements each of which being disposed in an orientation that is rotationally symmetric with the parallelogram optical path element about the center axis, the optical path elements being azimuthally separated so that the beam emerging from the back of each optical path element parallel to a direction at which it entered the optical path element does not intersect any other parallelogram optical path element.

7. The method as claimed in claim 6 wherein rotating the parallelogram optical path elements comprises rotating prisms having parallelogram top and bottom bases, the side walls at which the beam is reflected, and a front and a rear face at which the beam is refracted.

8. The method as claimed in claim 2 further comprising retroreflecting the beam that emerges from the back of the parallelogram optical path element to cause the beam to retrace its path through the optical path element, to effectively double the optical path length variation produced by the rotating parallelogram optical path element.

9. The method as claimed in claim 2 further comprising:
   reflecting the beam that emerges from the back of the parallelogram optical path element onto a path parallel to the path through the optical path element so that the beam emerges from the front of the parallelogram optical path element;
   retroreflecting the beam emerging from the front of the optical path element on the parallel path; and
   reflecting the retroreflected beam back onto the original path through the optical path element.

10. The method as claimed in claim 8 wherein retroreflecting the beam comprises reflecting the beam 180 degrees with a mirror.

11. A method of applying a substantially linearly varying optical path length delay to an optical beam, the method comprising:
   rotating an optical path element about an axis so that the optical path element intersects an incidence line during a first fraction of each cycle of rotation;
   inserting an input beam along the incidence line so that during the first fraction of each cycle the beam enters the optical path element at a predefined range of angles over which an optical path length of the optical path element varies substantially linearly with rotation;
   reflecting the beam from the incidence line to a reinsertion line outside of the first fraction of each cycle;
   reinserting the beam into the optical path element along the reinsertion line that is separated from the axis of rotation a same distance as the incidence line defining a second fraction of each cycle of rotation during which the optical path length varies; and
   retroreflecting the beam that emerges from the back of the optical path element to cause the beam to retrace its path through the optical path element, to effectively double the optical path length variation produced by the rotating optical path element.

12. The method as claimed in claim 11 wherein retroreflecting the beam comprises reflecting the beam 180 degrees with a mirror.

13. The method as claimed in claim 11 wherein rotating the optical path element comprises rotating a parallelogram optical path element including a pair of parallel planar reflectors defining side walls that enclose an optical transmission medium in the shape of a parallelogram prism, the rotation being about an axis that is directed orthogonal to top and bottom bases of the parallelogram prism, wherein the incidence line and reinsertion line are separated from the axis of rotation by a distance that permits intersection of an acute angle of the parallelogram but not an obtuse angle of the parallelogram, so that a beam input on the incident or reinsertion line enters a front of the parallelogram optical path element, reflects off each of the side walls, and exits the parallelogram optical path element in a direction parallel to the incidence or reinsertion line.

14. The method as claimed in claim 13 wherein rotating the parallelogram optical path element comprises rotating a prism having top and bottom parallelogram bases, the side walls at which the beam is reflected, and a front wall and a rear wall at which the beam is refracted.

15. The method as claimed in claim 14 wherein rotating the parallelogram optical path element further comprises rotating the parallelogram optical path element about an axis passing through a centroid of the parallelogram, which is separated from the incidence line by a length that is intermediate one half a minor diagonal length of the parallelogram and one half a major diagonal length of the parallelogram, so that in each cycle the front and back walls alternate function with respect to both the incidence line and reinsertion line.

16. The method as claimed in claim 14 further comprising reflecting the beam from the reinsertion line to a third insertion line outside of the first and second fractions of the cycle and inserting the beam into the optical path element along the third insertion line that is separated from the axis of rotation an equal distance as the incidence and reinsertion lines.

17. The method as claimed in claim 14 wherein rotating the parallelogram optical path element further comprises rotating a plurality of parallelogram optical path elements each of which being disposed in an orientation that is rotationally symmetric with the parallelogram optical path element about the center axis, the optical path elements being azimuthally separated so that the beam emerging from the back of each optical path element parallel to a direction at which it entered the optical path element does not intersect any other parallelogram optical path element.

18. The method as claimed in claim 17 wherein rotating the parallelogram optical path elements comprises rotating prisms having parallelogram top and bottom bases, the side walls at which the beam is reflected, and a front and a rear face at which the beam is refracted.

* * * * *